US008624538B2

(12) United States Patent
Yoshida et al.

(10) Patent No.: US 8,624,538 B2
(45) Date of Patent: Jan. 7, 2014

(54) MOTOR DRIVING APPARATUS HAVING FUNCTION OF DYNAMICALLY SWITCHING CONVERTER OPERATION MODE OF AC/DC CONVERTER

(75) Inventors: Tomokazu Yoshida, Minamitsuru-gun (JP); Takashi Harada, Minamitsuru-gun (JP); Shinichi Horikoshi, Minamitsuru-gun (JP); Yasusuke Iwashita, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 137 days.

(21) Appl. No.: 13/052,563

(22) Filed: Mar. 21, 2011

(65) Prior Publication Data
US 2011/0260662 A1 Oct. 27, 2011

(30) Foreign Application Priority Data

Apr. 22, 2010 (JP) ................................. 2010-099126

(51) Int. Cl.
*G05B 11/28* (2006.01)
(52) U.S. Cl.
USPC ........... 318/599; 318/722; 318/801; 318/811; 318/471; 318/472; 318/376; 363/40; 363/55; 388/811; 388/819
(58) Field of Classification Search
USPC ......... 318/599, 722, 810, 801, 811, 471, 472, 318/474, 475, 476; 363/37, 39, 40, 55; 320/144, 150; 388/811, 819
See application file for complete search history.

(56) References Cited

U.S. PATENT DOCUMENTS

| 4,697,131 | A | * | 9/1987 | Schauder et al. | ............. 318/762 |
| 5,504,667 | A | * | 4/1996 | Tanaka et al. | ................... 363/37 |
| 7,042,194 | B1 | * | 5/2006 | Kuroiwa et al. | ............. 318/811 |
| 7,292,004 | B2 | * | 11/2007 | Ueda et al. | ..................... 318/805 |
| 7,555,912 | B2 | * | 7/2009 | Schnetzka et al. | ........... 62/228.4 |
| 8,008,886 | B2 | * | 8/2011 | Kawashima et al. | ......... 318/811 |
| 2007/0216327 | A1 | | 9/2007 | Sugita | |

FOREIGN PATENT DOCUMENTS

| CN | 101039097 A | 9/2007 |
| EP | 2157684 A1 | 2/2010 |
| JP | 4-058785 A | 2/1992 |
| JP | 8-186986 A | 7/1996 |
| JP | 8-214550 A | 8/1996 |
| JP | 8-228490 | 9/1996 |

(Continued)

*Primary Examiner* — Antony M Paul
(74) *Attorney, Agent, or Firm* — Drinker Biddle & Reath LLP

(57) ABSTRACT

A motor driving apparatus is provided that performs AC/DC conversion by suppressing harmonics of the input at the time of normal operation, while on the other hand, allowing system operation to continue in the event of an overload by avoiding system stoppage. The motor driving apparatus, which drives a motor by supplying power from an AC power supply, includes: an AC/DC converter having a converter operation mode which is switched between a PWM converter operation mode in which an AC input voltage is converted into a DC voltage by applying PWM control to a plurality of power switching devices connected in serial and parallel fashion and a diode rectifier operation mode in which an AC input voltage is converted into a DC voltage by using a plurality of diodes each connected in reverse parallel with an associated one of the plurality of power switching devices; and a converter control unit which dynamically switches the converter operation mode of the AC/DC converter according to a load during powering of the motor.

3 Claims, 5 Drawing Sheets

(56) References Cited

FOREIGN PATENT DOCUMENTS

| JP | 2001-314085 A | 11/2001 |
| JP | 2003-306273 A | 10/2003 |
| JP | 2005-318700 A | 11/2005 |
| JP | 2008131851 A | 6/2008 |
| JP | 2008-253000 A | 10/2008 |

* cited by examiner

INPUT CURRENT IN DIODE
RECTIFIER OPERATION MODE

INPUT CURRENT IN PWM
CONVERTER OPERATION MODE

Fig. 3

| | CONVERTER OPERATION MODE IN POWERING OPERATION | REMARKS |
|---|---|---|
| PRIOR ART | DIODE RECTIFIER OPERATION MODE | · INPUT CONTAINS LARGE AMOUNT OF NOISE<br>· OUTPUT DC VOLTAGE IS DETERMINED BY CREST VALUE OF AC INPUT VOLTAGE |
| PRIOR ART | PWM CONVERTER OPERATION MODE | · CAN REDUCE HARMONICS OF INPUT CURRENT AND CAN MAKE OUTPUT DC VOLTAGE VARIABLE<br>· POWER DEVICE TEMPERATURE RISE IS LARGE |
| PRESENT INVENTION | DIODE RECTIFIER OPERATION MODE OR PWM CONVERTER OPERATION MODE | · DYNAMICALLY CHANGES CONVERTER OPERATION MODE ACCORDING TO LOAD CONDITION AND MAKES CONTINUOUS OPERATION POSSIBLE BY AVOIDING SYSTEM STOPPAGE |

MOTOR DRIVING APPARATUS HAVING FUNCTION OF DYNAMICALLY SWITCHING CONVERTER OPERATION MODE OF AC/DC CONVERTER

RELATED APPLICATION DATA

This application claims priority under 35 U.S.C. §119 and/or §365 to Japanese Application No. 2010-099126 filed Apr. 22, 2010, the entire contents of which is incorporated herein by reference.

BACKGROUND OF THE INVENTION

1. Field of the Invention

The present invention relates to a motor driving apparatus for driving a motor by supplying power from an AC power supply, and in particular to a motor driving apparatus having the function dynamically switching the converter operation mode of an AC/DC converter during powering operation of the motor.

2. Description of the Related Art

In a motor driving apparatus for a motor used to drive a machine tool, an industrial machine, a robot, or the like, a PWM converter method or a diode rectifier method is employed as an AC/DC conversion method to convert AC input power into DC power.

The PWM converter method is a method that brings the input current as close as possible to a sinusoidal waveform by applying PWM (pulse width modulation) control using power switching devices. While the PWM converter method has such advantages as being able to reduce harmonics of the input current and being able to make the output DC voltage variable, it has the disadvantage that the temperature increases due to the switching of the power switching devices is larger than in the diode rectifier method.

On the other hand, the diode rectifier method is a method that has been widely used and that performs rectification by passing the AC input from the power supply through a diode bridge circuit. While this method, contrary to the PWM converter method, has constraints such that the input contains a large amount of harmonics and that the output DC voltage is determined by the crest value of the AC input voltage, the temperature rise of the power switching devices is smaller than in the PWM converter method, because switching is not performed in the diode rectifier method.

In the regenerative operation in which the motor deceleration energy is returned to the power supply, the control that the PWM converter method performs is not much different from the control performed in the powering operation, and the switching devices need only be controlled so as to shift the phase of the current by 180 degrees relative to the phase of the voltage. On the other hand, in the case of the diode rectifier method, power regeneration is performed, not by the diodes, but by using devices such as IGBTs (insulated gate bipolar mode transistors) connected in reverse parallel with the diodes.

In the regeneration method commonly employed today, only two of the six switches are closed so that the regenerative current is caused to flow between the highest voltage phase and the lowest voltage phase in the three-phase power supply. This regeneration method is generally called the 120-degree conduction type power regeneration. The problem with this method is that since a large pulse-like current flows at once, the amount of noise is large and the output DC voltage abruptly changes, causing an undesirable side effect to the motor control.

Patent document 1 cited below discloses a technique that selects one or the other of the two operation modes, the diode rectifier mode or the PWM converter mode, when operating the motor in the powering mode. However, according to this technique, the operation mode once selected is fixed during the powering operation, so that the motor is operated only in the PWM converter mode or the diode rectifier mode, whichever is selected.

As described earlier, the PWM converter method has the problem that the temperature increases due to the operation of the power switching devices is large, while on the other hand, the diode rectifier method has the problems of a large amount of harmonics contained in the input current and the undesirable side effect due to the large current that flows when starting the regenerative operation. The PWM converter method may be employed in order to suppress the harmonic currents flowing to the power supply. However, if the load has increased during the PWM converter operation, the system has to be stopped in order to protect it from excessive increase in temperature.

Patent document 1: Japanese Unexamined Patent Publication No. H08-228490

SUMMARY OF THE INVENTION

The present invention has been devised in view of the above problems, and an object of the invention is to provide a motor driving apparatus that performs AC/DC conversion by suppressing harmonics of the input at the time of normal operation, while on the other hand, allowing system operation to continue in the event of an overload condition by avoiding system stoppage.

To achieve the above object, according to the present invention, there is provided a motor driving apparatus for driving a motor by supplying power from an AC power supply, wherein the apparatus includes: an AC/DC converter having a converter operation mode which is switched between a PWM converter operation mode in which an AC input voltage is converted into a DC voltage by applying PWM control to a plurality of power switching devices connected in serial and parallel fashion and a diode rectifier operation mode in which an AC input voltage is converted into a DC voltage by using a plurality of diodes each connected in reverse parallel with an associated one of the plurality of power switching devices; and a converter control unit which dynamically switches the converter operation mode of the AC/DC converter according to a load during powering operation of the motor.

In one preferred mode, the apparatus further includes a load detecting unit for detecting the load, wherein the converter control unit causes the AC/DC converter to operate in the PWM converter operation mode as long as the load detected by the load detecting unit is not greater than a predetermined level, and causes the AC/DC converter to operate in the diode rectifier operation mode when the load has exceeded the predetermined level.

The load detecting unit detects as the load the temperature of the power switching devices or the temperature of a heat sink on which the power switching devices are mounted. Alternatively, the load detecting unit detects a current flowing through the power switching devices and detects the load by integrating the current.

According to the motor driving apparatus of the invention, the converter operation mode of the AC/DC converter can be dynamically switched from the PWM converter operation mode to the diode rectifier operation mode during the powering operation of the motor. As a result, harmonics of the input can be suppressed during normal operation, while on the other hand, in the event of an overload condition the temperature increase of the power switching devices can be suppressed, thus making continuous operation possible by avoiding system stoppage.

BRIEF DESCRIPTION OF THE DRAWINGS

Further features and advantages of the present invention will be apparent from the following description with reference to the accompanying drawings, in which:

FIG. 3 is a diagram showing a comparison between the prior art and the present invention;

DETAILED DESCRIPTION

Figure 1:
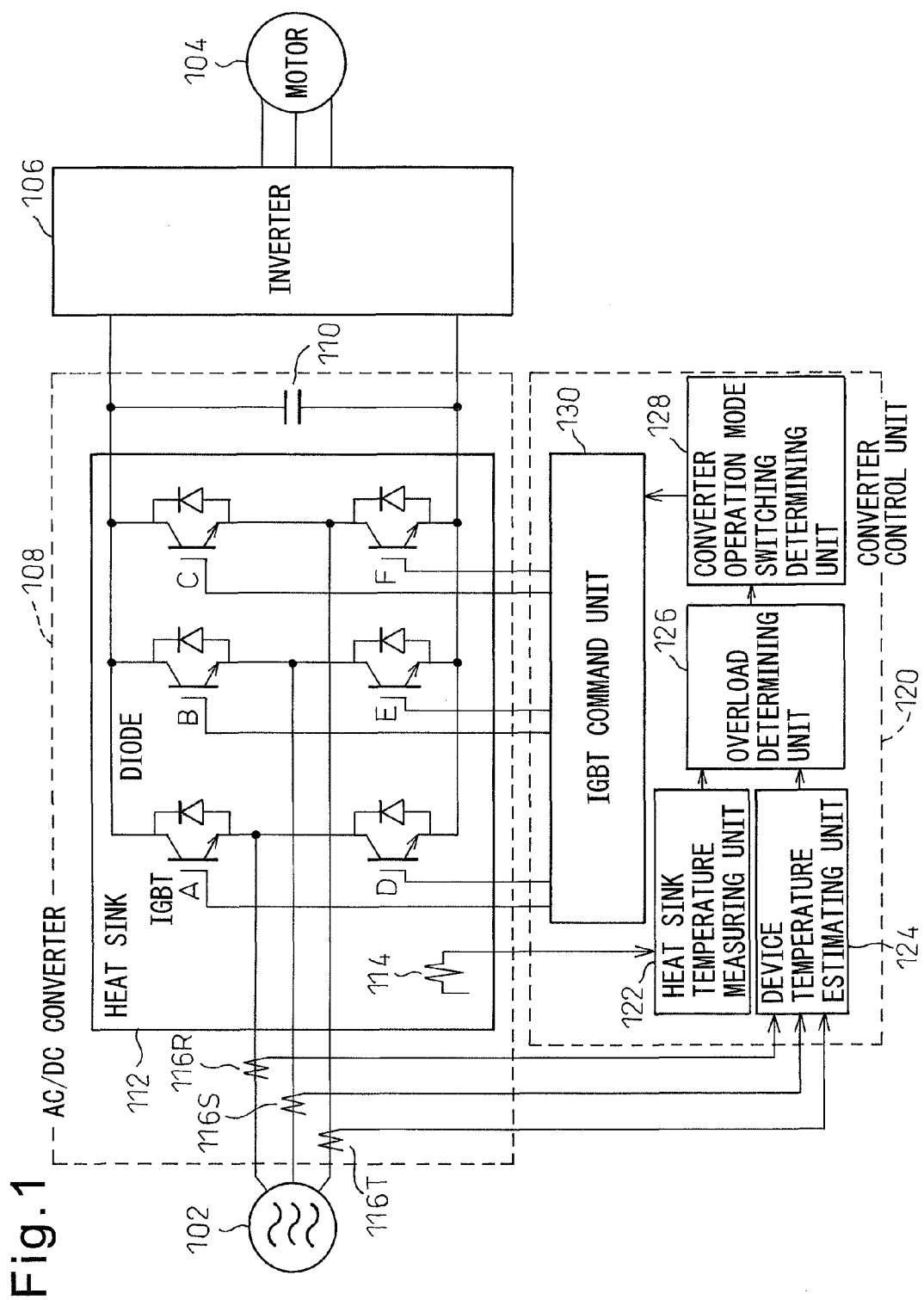
FIG. 1 is a block diagram showing one embodiment of a motor driving apparatus according to the present invention.

Embodiments of the present invention will be described below with reference to the accompanying drawings. FIG. 1 is a block diagram showing one embodiment of a motor driving apparatus according to the present invention. This motor driving apparatus is an apparatus that drives a motor 104 at variable speeds by supplying power from a three-phase commercial AC power supply 102, and includes an inverter 106, an AC/DC converter 108, and a converter control unit 120. The inverter 106 is, for example, a three-phase voltage PWM inverter, and converts the DC power produced by the AC/DC converter 108 into AC power suitable for motor control.

The AC/DC converter 108 includes six power semiconductor devices A, B, C, D, E, and F connected in serial and parallel fashion, and a smoothing capacitor 110. Each power semiconductor device includes an IGBT (insulated gate bipolar mode transistor), which is a self-extinguishable semiconductor power switching device, and a diode connected in reverse parallel with the IGBT. More specifically, the cathode of the diode is connected to the collector of the transistor, and the anode of the diode is connected to the emitter of the transistor. These power semiconductor devices are mounted on a heat sink 112.

The AC/DC converter 108 is provided with a temperature detecting element 114 for detecting the temperature of the heat sink 112. Also provided are current detecting elements 116R, 116S, and 116T (generally indicated by reference numeral 116) for detecting the input currents in the corresponding phases (R phase, S phase, and T phase) of the three-phase power supply 102.

The AC/DC converter 108 operates in one of two converter operation modes, the PWM converter operation mode or the diode rectifier operation mode. The PWM converter operation mode is a mode in which the AC input voltage is converted into a DC voltage by operating the IGBT section under PWM control. On the other hand, the diode rectifier operation mode is a mode in which the AC input voltage is converted into a DC voltage by turning off all the IGBTs and operating the diode section as a three-phase bridge rectifier circuit.

The converter control unit 120 controls the converter operation mode of the AC/DC converter 108. In the regenerative operation in which the power supplied from the inverter 106 during deceleration of the motor 104 is returned to the input power supply 102, the converter control unit 120 causes the AC/DC converter 108 to operate in the PWM converter operation mode. That is, in the regenerative operation, the converter control unit 120 performs control so that, of the R-phase, S-phase, and T-phase voltages of the three-phase power supply 102, the IGBT connected to the highest voltage phase and the IGBT connected to the lowest voltage phase are turned on and the other IGBTs are turned off.

On the other hand, in the powering operation in which the power from the input power supply 102 is supplied to the inverter 106, the converter control unit 120 performs control to dynamically switch the converter operation mode of the AC/DC converter 108 by selecting the PWM converter operation mode or the diode rectifier operation mode according to the load.

When the diode rectifier operation mode is selected in the powering operation, the command to the IGBT portions of the power semiconductor devices A to F is set to an off state, and the AC/DC conversion is performed using only the diodes. On the other hand, when the PWM converter operation mode is selected in the powering operation, the AC/DC conversion is performed using the IGBT portions as well as the diode portions of the power semiconductor devices A to F, and a PWM command is given to the IGBT portions.

Figure 2A:
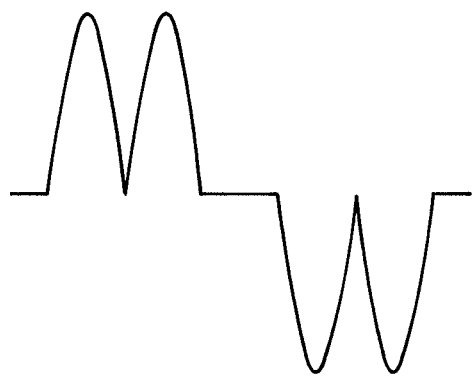
FIGS. 2A and 2B are diagrams each showing an input current waveform when an AC/DC converter is operated in a diode rectifier operation mode or a PWM converter operation mode, respectively.
Figure 2B:
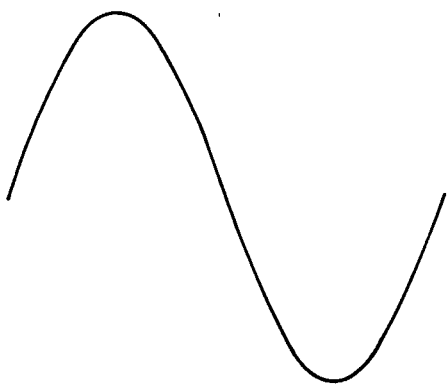

FIGS. 2A and 2B are diagrams each showing an input current waveform when the AC/DC converter 108 is operated in the diode rectifier operation mode or the PWM converter operation mode, respectively. As shown in FIG. 2A, the input current waveform in the diode rectifier operation mode is a waveform such that the diode conduction point changes from one to another for every 120-degree period, because the AC/DC conversion is performed by causing only the diode portions of the power semiconductor devices to conduct. During this time, the command to the IGBT portions of the power semiconductor devices is held in the off state. On the other hand, as shown in FIG. 2B, the input current waveform in the PWM converter operation mode is a sinusoidal waveform because the AC/DC conversion is performed by controlling the input current by giving a PWM command to the IGBT portions of the power semiconductor devices.

FIG. 3 is a diagram showing a comparison between the prior art and the present invention. In the prior art, the converter operation mode of the AC/DC converter in the powering operation is fixed to either the diode rectifier operation mode or the PWM converter operation mode. In the case of the diode rectifier operation mode, problems occur in that the input contains a large amount of harmonics and the output DC voltage is determined by the crest value of the AC input voltage. On the other hand, in the case of the PWM converter operation mode, while it provides the advantages of being able to reduce the harmonics contained in the input current and being able to make the output DC voltage variable, there is the problem of temperature increase due to the operation of the power switching devices becomes large.

In contrast, in the present invention, the converter operation mode of the AC/DC converter in the powering operation is not fixed to the diode rectifier operation mode or the PWM converter operation mode, but is dynamically switched from one to the other according to the condition of the load. This makes continuous operation possible by avoiding a system stoppage.

Figure 4:
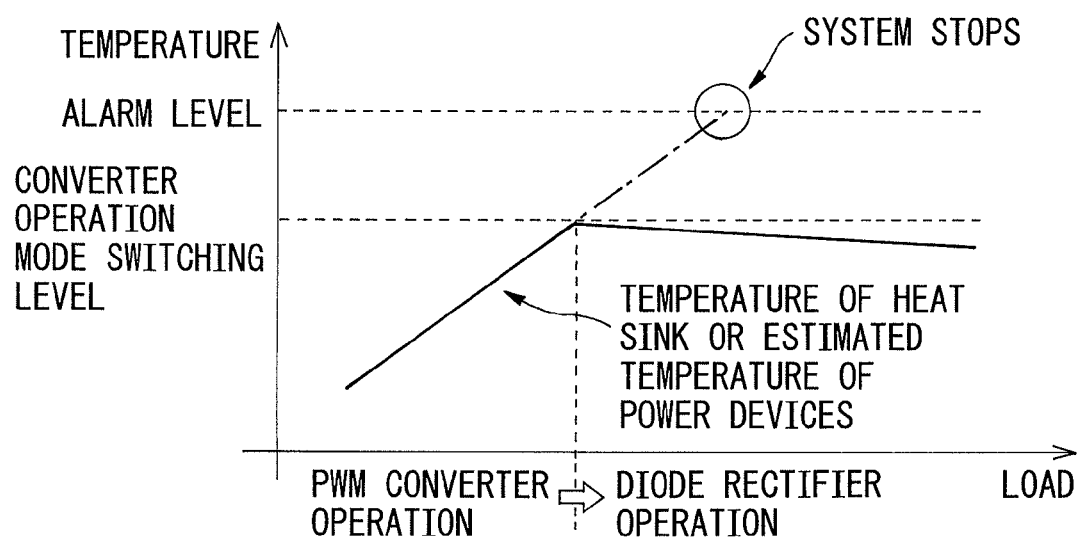
FIG. 4 is a diagram showing how a system stoppage is avoided by switching the converter operation mode of the AC/DC converter according to the load during powering operation.

FIG. 4 is a diagram showing how a system stoppage is avoided by switching the converter operation mode of the AC/DC converter according to the load during the powering operation. In FIG. 4, the abscissa represents the motor load, and the ordinate the temperature of the heat sink or the like. In the prior art, since the converter operation mode of the AC/DC converter cannot be dynamically switched during the powering operation, if the load increases up to a point where the temperature of the heat sink or the estimated temperature of the power semiconductor devices reaches an alarm level, the system is caused to stop.

In view of this, in the present invention, a converter operation mode switching level is provided below the alarm level. Such a converter operation mode switching level may be set only for either the temperature of the heat sink or the estimated temperature of the power semiconductor devices or may be set differently for each of them. Then, the converter control unit 120 compares such temperature data with the converter operation mode switching level and determines whether there is a need to switch the converter operation mode of the AC/DC converter 108 in the powering operation.

More specifically, if the temperature data rises up to the converter operation mode switching level as the load increases during operation in the PWM converter operation mode, the converter control unit 120 switches the converter operation mode of the AC/DC converter 108 to the diode rectifier operation mode. With this operation, a further increase in the temperature is suppressed, eliminating the need to stop the system in order to prevent excessive temperature rise.

To implement the above-described control, the converter control unit 120 includes, as shown in FIG. 1, a heat sink temperature measuring unit 122, a device temperature estimating unit 124, an overload determining unit 126, a converter operation mode switching determining unit 128, and an IGBT command unit 130. The operation of these units will be described with reference to FIG. 5.

Figure 5:
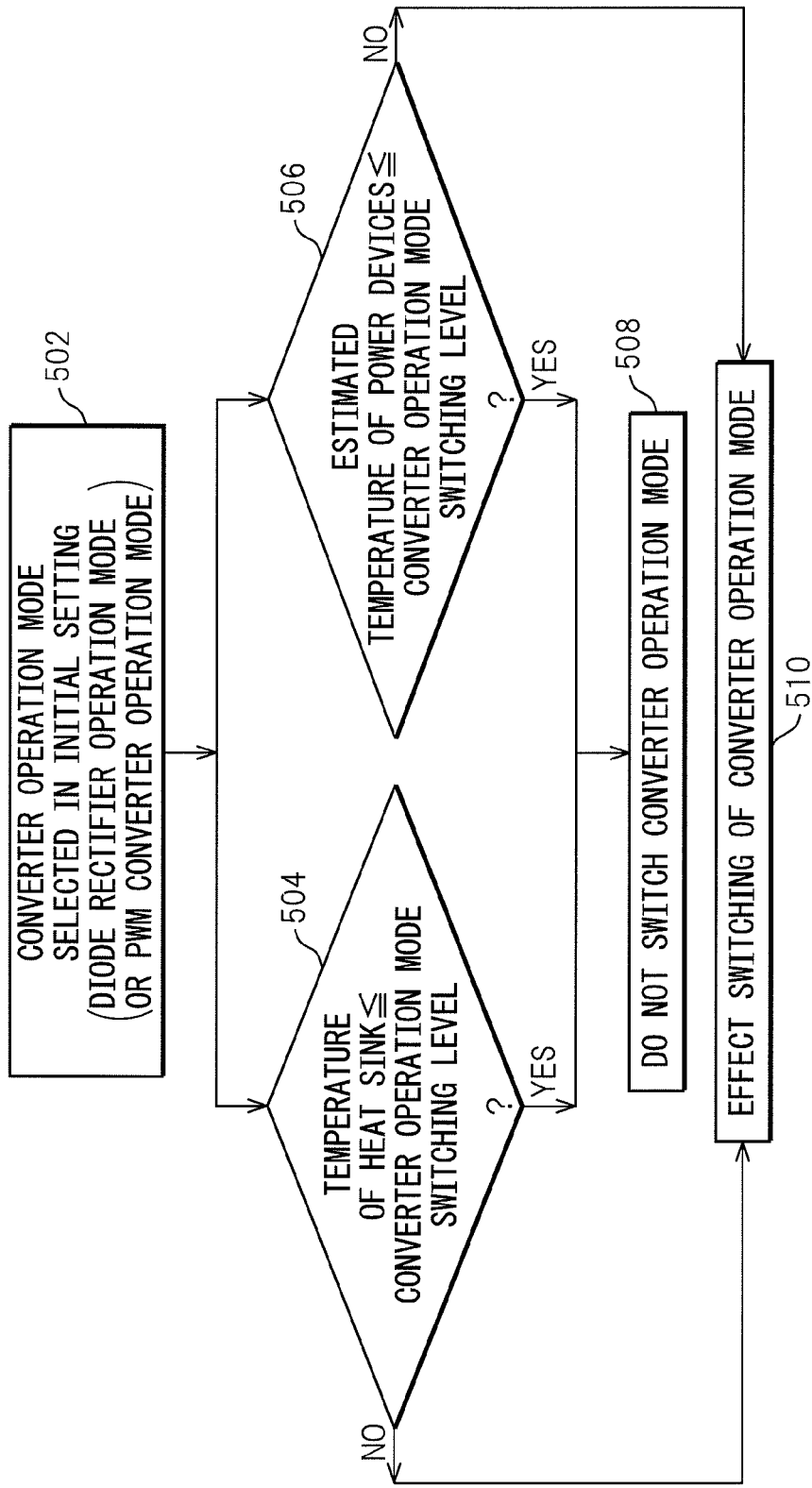
FIG. 5 is a flowchart illustrating how a converter control unit performs control during the powering operation.

FIG. 5 is a flowchart illustrating how the converter control unit 120 performs control during the powering operation. First, the IGBT command unit 130 causes the AC/DC converter 108 to operate in the converter operation mode selected in the initial setting (step 502). That is, in the case of the diode rectifier operation mode, the IGBT command unit 130 sends a "0" (off state) command to the IGBT portions of the power semiconductor devices A to F. On the other hand, in the case of the PWM converter operation mode, the IGBT command unit 130 sends a PWM command to the IGBT portions of the power semiconductor devices A to F.

Next, based on the output of the temperature detecting element 114, the heat sink temperature measuring unit 122 measures the temperature of the heat sink 112, and the overload determining unit 126 determines whether or not the temperature of the heat sink 112 is higher than the converter operation mode switching level, by comparing the measured temperature of the heat sink 112 with the predetermined converter operation mode switching level (step 504).

On the other hand, the device temperature estimating unit 124 estimates the temperature of the power semiconductor devices by integrating the input current detection value produced by the current detecting element 116, and the overload determining unit 126 determines whether or not the estimated temperature of the power semiconductor devices is higher than the converter operation mode switching level, by comparing the estimated temperature with the predetermined converter operation mode switching level (step 506).

If the result of the decision in step 504 is YES, and if the result of the decision in step 506 is YES, the converter operation mode switching determining unit 128 determines that there is no need to switch the converter operation mode of the AC/DC converter 108 (step 508).

On the other hand, if the result of the decision in step 504 is NO, or if the result of the decision in step 506 is NO, the converter operation mode switching determining unit 128 determines that there is a need to switch the converter operation mode of the AC/DC converter 108 from the PWM converter operation mode to the diode rectifier operation mode, and instructs the IGBT command unit 130 accordingly; then, in response to the instruction, the IGBT command unit 130 causes the converter operation mode of the AC/DC converter 108 to switch to the diode rectifier operation mode (step 510).

In this way, according to the present embodiment, if the temperature rises due to an overload condition, the converter operation mode of the AC/DC converter 108 is switched to the diode rectifier operation mode, thereby reducing the heat loss occurring in the AC/DC converter 108, while suppressing a further increase in the temperature and thus eliminating the need to stop the system in order to prevent excessive temperature increase.

While the embodiment of the present invention has been described above, it will be appreciated that the invention is not limited to the above specific embodiment, but can be carried out in various other embodiments. For example, instead of detecting the temperature of the heat sink on which the power semiconductor devices are mounted, provisions may be made to directly detect the temperature of the power semiconductor devices.

The invention may be embodied in other specific forms. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A motor driving apparatus for driving a motor by supplying power from an AC power supply, comprising:
   an AC/DC converter having a converter operation mode which is switched between a PWM converter operation mode in which an AC input voltage is converted into a DC voltage by applying PWM control to a plurality of power switching devices connected in serial and parallel fashion and a diode rectifier operation mode in which an AC input voltage is converted into a DC voltage by using a plurality of diodes each connected in reverse parallel with an associated one of said plurality of power switching devices;
   a converter control unit which dynamically switches said converter operation mode of said AC/DC converter according to a load during powering operation of said motor; and
   a load detecting unit for detecting said load, wherein said converter control unit causes said AC/DC converter to operate in said PWM converter operation mode as long as said load detected by said load detecting unit is not greater than a predetermined level, and causes said AC/DC converter to operate in said diode rectifier operation mode when said load has exceeded said predetermined level.

2. A motor driving apparatus as claimed in claim 1, wherein said load detecting unit detects as said load the temperature of said power switching devices or the temperature of a heat sink on which said power switching devices are mounted.

3. A motor driving apparatus as claimed in claim 1, wherein said load detecting unit detects a current flowing through said power switching devices and detects said load by integrating said current.

* * * * *